United States Patent
Kubo

(10) Patent No.: US 7,869,124 B2
(45) Date of Patent: Jan. 11, 2011

(54) LASER MICROSCOPE

(75) Inventor: Hirokazu Kubo, Hino (JP)

(73) Assignee: Olympus Corporation, Tokyo (JP)

( * ) Notice: Subject to any disclaimer, the term of this patent is extended or adjusted under 35 U.S.C. 154(b) by 55 days.

(21) Appl. No.: 12/469,944

(22) Filed: May 21, 2009

(65) Prior Publication Data

US 2009/0290209 A1 Nov. 26, 2009

(30) Foreign Application Priority Data

May 26, 2008 (JP) .............................. 2008-136979

(51) Int. Cl.
*G02B 21/06* (2006.01)
*G02B 21/00* (2006.01)
*G02F 1/33* (2006.01)

(52) U.S. Cl. ........................ 359/385; 359/305; 359/314; 359/368

(58) Field of Classification Search ................. 250/324, 250/459.1; 359/368, 385, 305, 314
See application file for complete search history.

(56) References Cited

U.S. PATENT DOCUMENTS 6,490,039 B2 * 12/2002 Maleki et al. ............... 356/436
2002/0149769 A1 10/2002 Roorda
2008/0192339 A1 * 8/2008 Kubo ......................... 359/385
2009/0122397 A1 * 5/2009 Kubo et al. ................. 359/386

* cited by examiner

*Primary Examiner*—David N Spector
(74) *Attorney, Agent, or Firm*—Holtz, Holtz, Goodman & Chick, PC

(57) ABSTRACT

It is an object to perform high-precision observation by compensating group-velocity-delay dispersion and angular dispersion with a simple structure. The invention provides a laser microscope 1 including a light source; an acousto-optic deflector 7 that deflects ultrashort-pulse laser light L emitted from the light source; an angular-dispersion element 8, disposed in front of or after the acousto-optic deflector 7, that applies angular dispersion in a direction opposite to the acousto-optic deflector 7; and a group-velocity-delay dispersion-amount adjusting unit 10 that adjusts the amount of dispersion compensation by moving the angular-dispersion element 8 so as to vary the optical path length at each wavelength between the angular-dispersion element 7 and the acousto-optic deflector 8.

9 Claims, 3 Drawing Sheets

LASER MICROSCOPE

BACKGROUND OF THE INVENTION

1. Field of the Invention

The present invention relates to a laser microscope.

This application is based on Japanese Patent Application No. 2008-136979, the content of which is incorporated herein by reference.

2. Description of Related Art

A known laser microscope in the related art is provided with an acousto-optic deflector that can perform even random scanning at high speed compared with a galvanometer mirror, without any mechanical parts (for example, see U.S. Patent Application, Publication No. 2002/0149769). In this laser microscope, an angular-dispersion element formed of a prism is inserted before or after the acousto-optic deflector to compensate for angular dispersion of the acousto-optic deflector.

Since the acousto-optic deflector is an optical element having large group-velocity-delay dispersion, and therefore, this dispersion must be compensated for. One known technique of compensating for the group-velocity-delay dispersion is to use a group-velocity-delay dispersion compensator formed of a pair of prisms that can move relative to each other and a mirror.

BRIEF SUMMARY OF THE INVENTION

However, with a group-velocity-delay dispersion compensator provided with a pair of prisms that can be relatively moved, it is necessary to ensure a large space between the prisms in order to compensate for a large group-velocity-delay dispersion of the acousto-optic deflector. Furthermore, in order to vary the amount of dispersion compensation, the space between the prisms must be changed by a large amount. Therefore, the system becomes large, and a complicated mechanism is required for shifting the prisms and mirrors in synchronization. In particular, when two acousto-optic deflectors are disposed in alignment in the optical axis direction to scan a laser beam in two dimensions, the group-velocity-delay dispersion doubles. Therefore, there is a problem in that it is necessary to use an even larger system to compensate for this.

An object of the present invention is to provide a laser microscope in which group-velocity-delay dispersion and angular dispersion can be compensated with a simple structure, enabling high-precision observation.

The present invention provides a laser microscope including a light source; an acousto-optic deflector that deflects ultrashort-pulse laser light emitted from the light source; an angular-dispersion element that applies angular dispersion in a direction opposite to that of the acousto-optic deflector, the angular-dispersion element being disposed in front of or after the acousto-optic deflector; and a group-velocity-delay dispersion-amount adjusting unit that adjusts the amount of dispersion compensation by moving the angular-dispersion element so as to vary the optical path length at each wavelength between the angular-dispersion element and the acousto-optic deflector.

According to the present invention, the ultrashort-pulse laser light emitted from the light source is deflected by the acousto-optic deflector, thereby scanning the specimen at high speed to illuminate it, thus enabling it to be observed, or alternatively, allowing a stimulus to be precisely applied to a specific region on the specimen. Angular dispersion is generated at the acousto-optic deflector, and the optical path at each wavelength changes; however, by applying an angular dispersion in the opposite direction with the angular-dispersion element disposed before or after the acousto-optic deflector, it is possible to cancel the change in the optical path at each wavelength. In addition, by moving the angular-dispersion element by operating the group-velocity-delay dispersion-amount adjusting unit, it is possible to change the optical path length at each wavelength between the angular-dispersion element and the acousto-optic deflector, thus adjusting the amount of dispersion compensation.

In this case, according to the present invention, by using the angular-dispersion element for compensation of both angular dispersion and group-velocity-delay dispersion, it is possible to reduce the number of components and to simplify the structure. Also, it is possible to decrease the amount of movement of the optical elements required for compensating for the group-velocity-delay dispersion, thus reducing the size of the apparatus and enabling rapid switching of the optics when changing the wavelength or replacing the objective lens.

In the present invention described above, the angular-dispersion element may include at least one prism.

The angular dispersion of the acousto-optic deflector is compensated for based on the position of the prism, and it is possible to adjust the amount of compensation of the group-velocity-delay dispersion by moving the prism.

Preferably, the present invention described further includes an alignment-adjusting mechanism that adjusts the alignment of an optical axis from the prism to the acousto-optic deflector when the wavelength of the ultrashort-pulse laser light is changed.

By doing so, the variation of the optical path due to a change in wavelength of the ultrashort-pulse laser light can be corrected, thus preventing shifting of the incident position of the ultrashort-pulse laser light on the acousto-optic deflector.

In the present invention described above, the group-velocity-delay dispersion-amount adjusting unit may move the prism in a direction that varies the optical path length of the ultrashort-pulse laser light passing through the prism.

By doing so, it is possible to adjust the amount of group-velocity-delay dispersion compensation with a simple mechanism that moves the prism.

In the present invention described above, the angular-dispersion element may include at least one grating.

Because the amount of compensation of the group-velocity-delay dispersion of the grating is large compared with that of the prism, it is possible to further reduce the size of the apparatus.

Preferably, the present invention described above further includes an alignment-adjusting mechanism that adjusts the alignment of an optical axis from the grating to the acousto-optic deflector when the wavelength of the ultrashort-pulse laser light is changed.

By doing so, variation of the optical path due to a change in wavelength of the ultrashort-pulse laser light can be corrected, thus preventing shifting of the incident position of the ultrashort-pulse laser light on the acousto-optic deflector.

In the present invention described above, the alignment-adjusting mechanism may vary the angle of the grating.

By doing so, it is not necessary to provide a separate alignment-adjusting mechanism, and therefore the number of components can be decreased, simplifying the apparatus.

In the present invention described above, the group-velocity-delay dispersion-amount adjusting unit may move the grating in a direction that varies the distance from the grating to the acousto-optic deflector.

By doing so, it is possible to adjust the amount of compensation of group-velocity-delay dispersion with a simple mechanism that moves the grating.

The present invention described above may further include a beam-shaping optical system disposed between the grating and the acousto-optic deflector and including at least one lens that adjusts the beam diameter and/or divergence angle of the ultrashort-pulse laser light incident on the acousto-optic deflector.

By doing so, the variation in beam diameter and beam divergence angle, which vary when compensating the group-velocity-delay dispersion with the grating, can be reduced by the beam-shaping optical system, and therefore, adjustment is possible so that the ultrashort-pulse laser light is incident uniformly on the acousto-optic deflector.

Advantages of the present invention are the ability to compensate for group-velocity-delay dispersion and angular dispersion with a simple configuration, and to perform high-precision observation.

DETAILED DESCRIPTION OF THE INVENTION

A laser microscope 1 according to a first embodiment of the present invention will be described below with reference to FIGS. 1 and 2.

Figure 1:
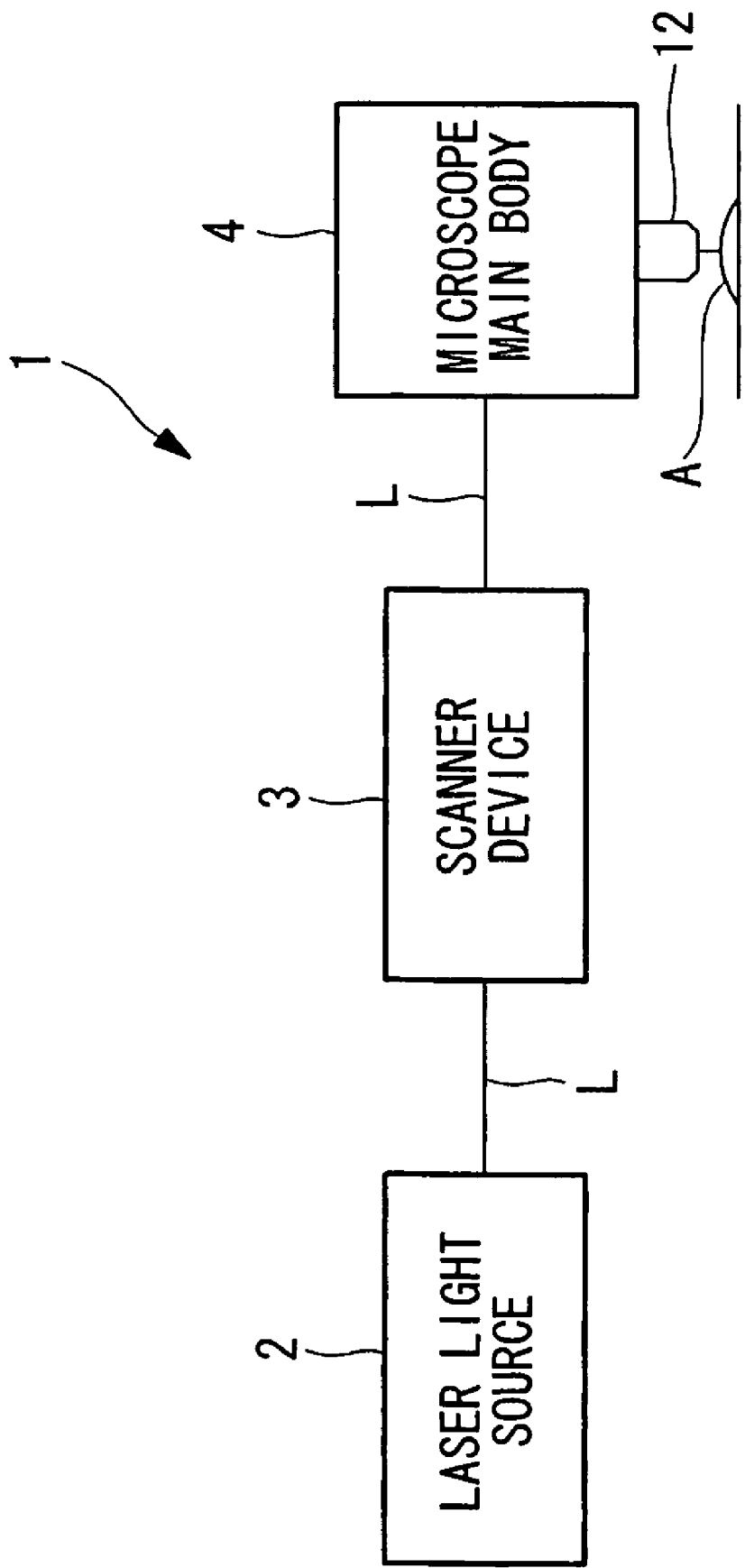
FIG. 1. is a block diagram showing a laser microscope according to a first embodiment of the present invention.

As shown in FIG. 1, the laser microscope 1 according to this embodiment includes a laser light source (light source) 2 that generates femtosecond-pulse laser light (ultrashort-pulse laser light) L, a scanner device 3 that scans the femtosecond-pulse laser light L emitted from the laser light source 2, and a microscope main body 4 that irradiates a specimen A with the femtosecond-pulse laser light L scanned by the scanner device 3 and detects fluorescence.

Figure 2:
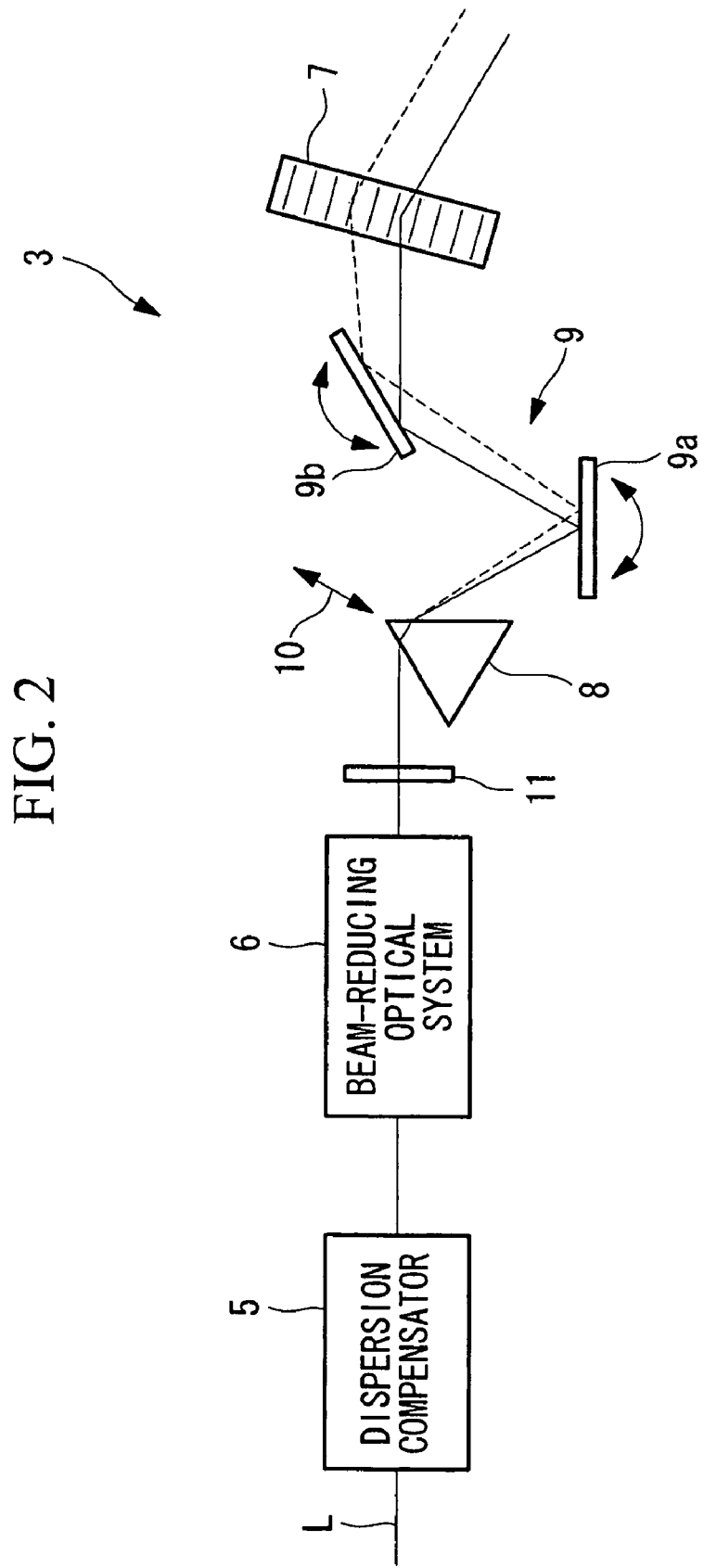
FIG. 2 is a diagram for explaining a scanner device of the laser microscope in FIG. 1.

As shown in FIG. 2, the scanner device 3 includes a dispersion compensator 5 that roughly compensates the group-velocity-delay dispersion generated in the light paths of the femtosecond-pulse laser light L emitted from the laser light source 2 in the entire laser microscope 1, a beam-reducing optical system (beam-shaping optical system) 6 that adjusts the beam diameter of the femtosecond-pulse laser light L whose group-velocity-delay dispersion is compensated by the dispersion compensator 5, and an acousto-optic deflector (AOD) 7 that scans the femtosecond-pulse laser light L.

The scanner device 3 includes a prism (angular-dispersion element) 8 that is disposed between the acousto-optic deflector 7 and the beam-reducing optical system 6 and that applies angular dispersion in the opposite direction to that of the acousto-optic deflector 7, and an alignment-adjusting mechanism 9 that adjusts the optical axis position of the femtosecond-pulse laser light L emitted from the prism 8. The prism 8 is provided with a group-velocity-delay dispersion-amount adjusting unit 10 that moves the prism 8 to adjust the amount of dispersion compensation applied to the femtosecond-pulse laser light L.

A half-wave plate 11 for optimally adjusting the polarization direction of the femtosecond-pulse laser light L incident on the prism 8 and the acousto-optic deflector 7 is disposed in front of the prism 8 and in front of the acousto-optic deflector 7.

The group-velocity-delay dispersion-amount adjusting unit 10 is configured so as to move the prism 8 in a direction such that one vertex thereof is moved back and forth. By doing so, the optical path length of the femtosecond-pulse laser light L passing through the prism 8 is varied, thereby making it possible to adjust the amount of dispersion compensation applied to the femtosecond-pulse laser light L.

The alignment-adjusting mechanism 9 is formed of two adjusting mirrors 9a and 9b disposed opposing each other. By adjusting the two mirrors 9a and 9b, the deflection directions of the reflected femtosecond-pulse laser light L are varied, enabling adjustment of the incident position on the acousto-optic deflector 7.

By continuously modulating the acoustic wave frequency input to the acousto-optic deflector 7, the exit direction of the femtosecond-pulse laser light L is continuously varied at high speed, thereby making it possible to one-dimensionally scan the femtosecond-pulse laser light L. To two-dimensionally scan the femtosecond-pulse laser light L, two acousto-optic deflectors 7 are disposed in series with their deflection directions tilted by 90°.

By radiating the femtosecond-pulse laser light L emitted from the acousto-optic deflectors 7 onto the specimen via a pupil-projection lens, an image-forming lens (neither of which are illustrated), and an objective lens 12 to focus the light in the focal plane of the objective lens 12, a fluorescent substance in the specimen A can be excited via a multiphoton excitation effect, thus generating multiphoton fluorescence. The multiphoton fluorescence generated in the specimen A is collected by the objective lens 12 and is split off from the excitation light path to be detected by a light detector (not shown in the drawings). Thus, by storing the scanning position of the acousto-optic deflectors 7 and the intensity of the multiphoton fluorescence detected in the light detector in association with each other, it is possible to obtain a two-dimensional fluorescence image.

The operation of the thus-configured laser microscope 1 according to this embodiment will be explained below.

To perform multiphoton fluorescence observation of the specimen A with the laser microscope 1 according to this embodiment, the femtosecond-pulse laser light L is generated by the laser light source 2. The group-velocity-delay dispersion is roughly compensated by passing the femtosecond-pulse laser light L through the dispersion compensator 5, and thereafter, the beam diameter is adjusted by the beam-reducing optical system 6.

This shaped femtosecond-pulse laser light L has angular dispersion in the opposite direction to that of the acousto-optic deflector 7 applied thereto by the prism 8, and is incident on the acousto-optic deflector 7 with its optical axis position adjusted by the alignment-adjusting mechanism 9.

By rapidly varying the acoustic wave frequency input to the acousto-optic deflectors 7, it is possible to continuously change the emission directions of the femtosecond-pulse laser light L, thus scanning it. By operating the acousto-optic deflectors 7 disposed in mutually orthogonal directions, it is possible to two-dimensionally scan the emitted femtosecond-pulse laser light L.

The femtosecond-pulse laser light L two-dimensionally scanned by the acousto-optic deflectors 7 is radiated onto the specimen A via the pupil-projection lens, the image-forming lens, and the objective lens 12, exciting the fluorescent substance in the specimen A and generating multiphoton fluorescence. The generated multiphoton fluorescence is detected by the light detector after being collected by the objective lens 12. By storing the scanning position of the acousto-optic deflectors 7 and intensity information of the multiphoton fluorescence from the light detector in association with each other, it is possible to obtain a two-dimensional fluorescence image.

In this case, because an angular dispersion in the opposite direction to that of the acousto-optic deflectors 7 is applied to the femtosecond-pulse laser light upon passing through the prism 8, the femtosecond-pulse laser light emitted from the acousto-optic deflectors 7 is emitted with its angular dispersion compensated. Therefore, it is possible to reduce beam spreading of the femtosecond-pulse laser light emitted from the acousto-optic deflectors 7.

Furthermore, due to the action of the group-velocity-delay dispersion-amount adjusting unit 10, the optical path length of the femtosecond-pulse laser light L passing through the prism 8 is varied by moving the prism 8, thereby allowing the amount of dispersion compensation applied to the femtosecond-pulse laser light L to be varied.

As a result, the group-velocity-delay dispersion from the laser light source 2 to the tip of the objective lens 12 is compensated by the amount of dispersion compensation applied by the prism 8 in conjunction with the amount of dispersion compensation applied by the dispersion compensator 5. Because the group-velocity-delay dispersion is roughly compensated by the dispersion compensator 5, it is possible to finely adjust the amount of dispersion compensation at the prism 8, which is advantageous in that a substantially Fourier-limited pulse can be observed with superior precision at the surface of the specimen A, the multiphoton excitation efficiency can be increased, and a bright, clear fluorescence image can be acquired.

In other words, with the laser microscope 1 according to this embodiment, it is possible to perform compensation of group-velocity-delay dispersion using the prism 8, which is an angular-dispersion element for compensating for angular dispersion. Therefore, it is possible to simplify the structure of the apparatus, reduce the size, and lower costs. In addition, an advantage is afforded in that the amount of movement of the optical element for compensating for the group-velocity-delay dispersion can be reduced, which improves the response speed when changing the wavelength, replacing the objective lens, or the like.

In this embodiment the polarization direction of the femtosecond-pulse laser light L incident on the prism 8 and the acousto-optic deflector 7 is adjusted by placing the half-wave plate 11 before the prism 8. However, when two-dimensionally scanning the femtosecond-pulse laser light L, it is preferable to orthogonally dispose two acousto-optic deflectors 7 with a 90° difference between their deflection directions, and then to dispose a half-wave plate also in front of the acousto-optic deflectors 7, and to set the prism 8 and the mirrors 9a and 9b of the alignment-adjusting mechanism 9 at positions such that the angles at which they are disposed are tilted by 45° relative to the deflection directions of the two acousto-optic deflectors 7. By doing so, the direction of the angular dispersion applied by the prism 8 is 45° relative to the deflection direction of the two acousto-optic deflectors 7.

With the half-wave plate 11 before the prism 8, the polarization direction of the femtosecond-pulse laser light L is aligned in the optimum direction relative to the prism 8 (the same direction as the direction of the angular dispersion), and with the half-wave plate 11 before acousto-optic deflector 7, the polarization direction is aligned in the optimum direction relative to the first acousto-optic deflector 7 (the same direction as the deflection direction of the acousto-optic deflector 7), thereby making it possible for the femtosecond-pulse laser light L to be incident on the prism 8 and the two orthogonally disposed acousto-optic deflectors 7 with the respective optimum polarization directions therefor. Because the polarization direction of the light emitted from the first acousto-optic deflector 7 is orthogonal to the polarization direction of the incident light, it is automatically the optimum polarization direction for the second acousto-optic deflector 7.

Accordingly, it is possible to efficiently compensate for the angular dispersion with the two orthogonally disposed acousto-optic deflectors 7.

The prism 8 is assumed to be moved by the group-velocity-delay dispersion-amount adjusting unit 10 in a direction such that one vertex is moved back and forth. Instead of this, however, it is possible to move the prism 8 in any direction that enables variation of the optical path length of the femtosecond-pulse laser light L passing through the prism 8.

Although angular-dispersion compensation and fine adjustment of the amount of dispersion compensation are performed by the single prism 8, two or more prisms may be used.

The prism 8 and the alignment-adjusting mechanism 9 may be disposed after the acousto-optic deflector 7.

Next, a laser microscope according to a second embodiment of the present invention will be described below with reference to FIG. 3.

In the description of this embodiment, parts having the same configuration as those in the laser microscope according to the first embodiment described above are assigned the same reference numerals, and a description thereof will be omitted.

Figure 3:
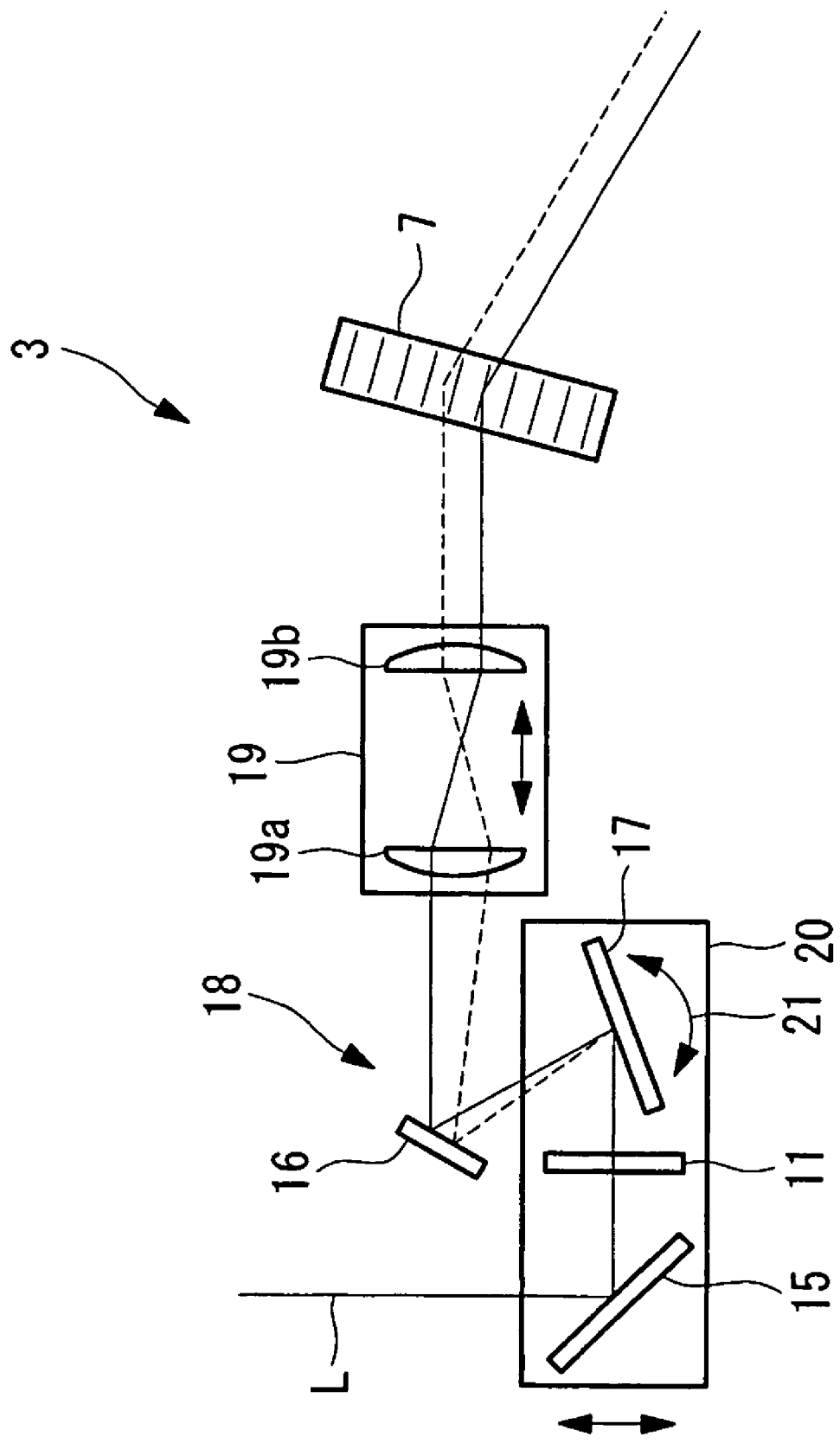
FIG. 3 is a diagram for explaining a scanner device of a laser microscope according to a second embodiment of the present invention.

As shown in FIG. 3, the laser microscope 1 according to this embodiment includes a dispersion-compensating optical system 18, composed of static mirrors 15 and 16 and a reflection grating (angular-dispersion element) 17, and a variable-magnification beam-reducing optical system (beam-shaping optical system) 19, which are disposed between the laser light source 2 (see FIG. 1) and the acousto-optic deflector 7.

The dispersion-compensating optical system 18 is configured to move a slider (group-velocity-delay dispersion-amount adjusting unit) 20, on which the static mirror 15 and the movable grating 17 are mounted, in a direction to change the distance relative to the static mirror 16.

The beam-reducing optical system 19, for example, can change the distance between two cylindrical lenses 19a and 19b disposed facing each other with a certain gap therebetween in the optical axis direction, thereby adjusting the distance so as to achieve the optimum beam diameter and beam divergence angle for the acousto-optic deflector 7 according to the variation in the amount of dispersion compensation.

The grating 17 can be adjusted so as to vary the emission angle thereof, thereby forming an alignment-adjusting mechanism 21 that adjusts the optical axis position of the femtosecond-pulse laser light L incident on the acousto-optic deflector 7.

Providing the static mirror 16, which reflects the femtosecond-pulse laser light L emitted from the grating 17, increases the optical path length at the long-wavelength side of the femtosecond-pulse laser light L diffracted at the grating 17, thus making it possible to apply the amount of group-velocity-delay dispersion compensation to the femtosecond-pulse laser light L. Thus, by adjusting the distance between the grating 17 and the static mirror 16 by moving the slider 20, it is possible to adjust the amount of dispersion compensation applied to the femtosecond-pulse laser light L.

At the same time, an angular dispersion in the opposite direction to that of the acousto-optic deflector 7 can be applied to the femtosecond-pulse laser light L at the grating 17.

Because the amount of angular dispersion applied by the grating 17 is too large, it can be adjusted so as to restore, by the subsequent beam-reducing optical system 19, the angular dispersion excessively applied.

The thus-configured laser microscope has an advantage in that, by using the grating 17 that can perform stronger compensation of group-velocity-delay dispersion than the prism 8, the apparatus can be made more compact. Additionally, by using the grating 17 with a large amount of dispersion compensation, it is not necessary to provide the dispersion compensator 5 as in the first embodiment, and therefore, the apparatus can be made even more compact.

In this embodiment, similarly to the first embodiment, when two-dimensionally scanning the femtosecond-pulse laser light L, two of the acousto-optic deflectors 7 may be orthogonally disposed with their deflection directions differing by 90°, a half-wave plate may be disposed before the acousto-optic deflectors 7, and the grating 17 and the static mirror 16 may be set at positions such that their placement angles are tilted by 45° relative to the deflection directions of the two acousto-optic deflectors 7. By doing so, the direction of the angular dispersion applied by the grating 17 can be set at 45° relative to the deflection directions of the two acousto-optic deflectors 7, thus affording the same advantages as described above.

What is claimed is:

1. A laser microscope comprising:
   a light source;
   an acousto-optic deflector that deflects ultrashort-pulse laser light emitted from the light source;
   an angular-dispersion element that applies angular dispersion in a direction opposite to that of the acousto-optic deflector, the angular-dispersion element being disposed in front of or after the acousto-optic deflector; and
   a group-velocity-delay dispersion-amount adjusting unit that adjusts the amount of dispersion compensation by moving the angular-dispersion element so as to vary the optical path length at each wavelength between the angular-dispersion element and the acousto-optic deflector.

2. A laser microscope according to claim 1, wherein the angular-dispersion element comprises at least one prism.

3. A laser microscope according to claim 2, further comprising an alignment-adjusting mechanism that adjusts the alignment of an optical axis from the prism to the acousto-optic deflector when the wavelength of the ultrashort-pulse laser light is changed.

4. A laser microscope according to claim 2, wherein the group-velocity-delay dispersion-amount adjusting unit moves the prism in a direction that varies the optical path length of the ultrashort-pulse laser light passing through the prism.

5. A laser microscope according to claim 1, wherein the angular-dispersion element comprises at least one grating.

6. A laser microscope according to claim 5, wherein the group-velocity-delay dispersion-amount adjusting unit moves the grating in a direction that varies the distance from the grating to the acousto-optic deflector.

7. A laser microscope according to claim 5 further comprising a beam-shaping optical system disposed between the grating and the acousto-optic deflector and including at least one lens that adjusts the beam diameter and/or divergence angle of the ultrashort-pulse laser light incident on the acousto-optic deflector.

8. A laser microscope according to claim 5, further comprising an alignment-adjusting mechanism that adjusts the alignment of an optical axis from the grating to the acousto-optic deflector when the wavelength of the ultrashort-pulse laser light is changed.

9. A laser microscope according to claim 8, wherein the alignment-adjusting mechanism varies the angle of the grating.

* * * * *